(12) United States Patent
Asada

(10) Patent No.: US 12,155,456 B2
(45) Date of Patent: Nov. 26, 2024

(54) OPTICAL TRANSMISSION SYSTEM, OPTICAL DEVICE, AND OPTICAL TRANSMISSION METHOD

(71) Applicant: NEC Corporation, Tokyo (JP)

(72) Inventor: Hideo Asada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 17/801,287

(22) PCT Filed: Feb. 26, 2021

(86) PCT No.: PCT/JP2021/007475
§ 371 (c)(1),
(2) Date: Aug. 22, 2022

(87) PCT Pub. No.: WO2021/182141
PCT Pub. Date: Sep. 16, 2021

(65) Prior Publication Data
US 2023/0101846 A1    Mar. 30, 2023

(30) Foreign Application Priority Data
Mar. 10, 2020 (JP) .................................. 2020-041096

(51) Int. Cl.
*H04J 14/02* (2006.01)
(52) U.S. Cl.
CPC ................ *H04J 14/0227* (2013.01)
(58) Field of Classification Search
CPC .. H04J 14/0227; H04J 14/0295; H04B 10/03; H04B 10/29

(Continued)

(56) References Cited

U.S. PATENT DOCUMENTS 6,947,377 B1 * 9/2005 Shimano ............. H04J 14/0227
370/227
9,755,734 B1 * 9/2017 Vusirikala ............ H04B 10/038
(Continued)

FOREIGN PATENT DOCUMENTS

EP    1096712 A2 *  5/2001   .......... H04J 14/0227
JP    0969615 A2 *  1/2000   .......... H04Q 11/0478
(Continued)

OTHER PUBLICATIONS

International Search Report for PCT Application No. PCT/JP2021/007475, mailed on May 25, 2021.
(Continued)

*Primary Examiner* — Abbas H Alagheband
(74) *Attorney, Agent, or Firm* — Sughrue Mion, PLLC

(57) ABSTRACT

In a case where a failure occurs in a part of an optical fiber in an optical cable, when attempting to switch to a redundant configuration, the stable use of an optical transmission system is impaired, so that the wavelength band cannot be used effectively. Accordingly, the optical transmission system of the present invention includes a first optical device configured to change the transmission line of a wavelength band signal propagating through a first optical transmission line to a second optical transmission line that is the same path as the first optical transmission line, in the stage before a faulty part in the first optical transmission line, and a second optical device configured to change the transmission line of the wavelength band signal from the second optical transmission line to the first optical transmission line, in the stage after the faulty part.

9 Claims, 11 Drawing Sheets

(58) Field of Classification Search
USPC .......................................................... 398/79
See application file for complete search history.

(56) References Cited

U.S. PATENT DOCUMENTS

| | | | |
|---|---|---|---|
| 11,265,628 B2* | 3/2022 | Araya | ................... H04J 3/1652 |
| 2007/0154219 A1* | 7/2007 | Feinberg | ............. H04J 14/0227 |
| | | | 398/104 |
| 2013/0028592 A1 | 1/2013 | Fujii et al. | |
| 2015/0295674 A1 | 10/2015 | Inoue | |
| 2015/0333821 A1* | 11/2015 | Takeshita | ............ G06F 11/2025 |
| | | | 398/2 |

FOREIGN PATENT DOCUMENTS

| | | | |
|---|---|---|---|
| JP | 2001-197083 A | 7/2001 | |
| JP | 2002141867 A * | 5/2002 | |
| JP | 2005286961 A * | 10/2005 | |
| JP | 2009-088606 A | 4/2009 | |
| JP | 2013-030884 A | 2/2013 | |
| JP | 2013-243559 A | 12/2013 | |
| JP | 2019-517169 A | 6/2019 | |
| WO | WO-2004077716 A1 * | 9/2004 | .......... H04J 14/0209 |
| WO | WO-2011118545 A1 * | 9/2011 | ........... H04B 10/032 |
| WO | 2014/006861 A1 | 1/2014 | |
| WO | 2014/010151 A1 | 1/2014 | |
| WO | 2014/020896 A1 | 2/2014 | |

OTHER PUBLICATIONS

English translation of Written opinion for PCT Application No. PCT/JP2021/007475, mailed on May 25, 2021.

* cited by examiner

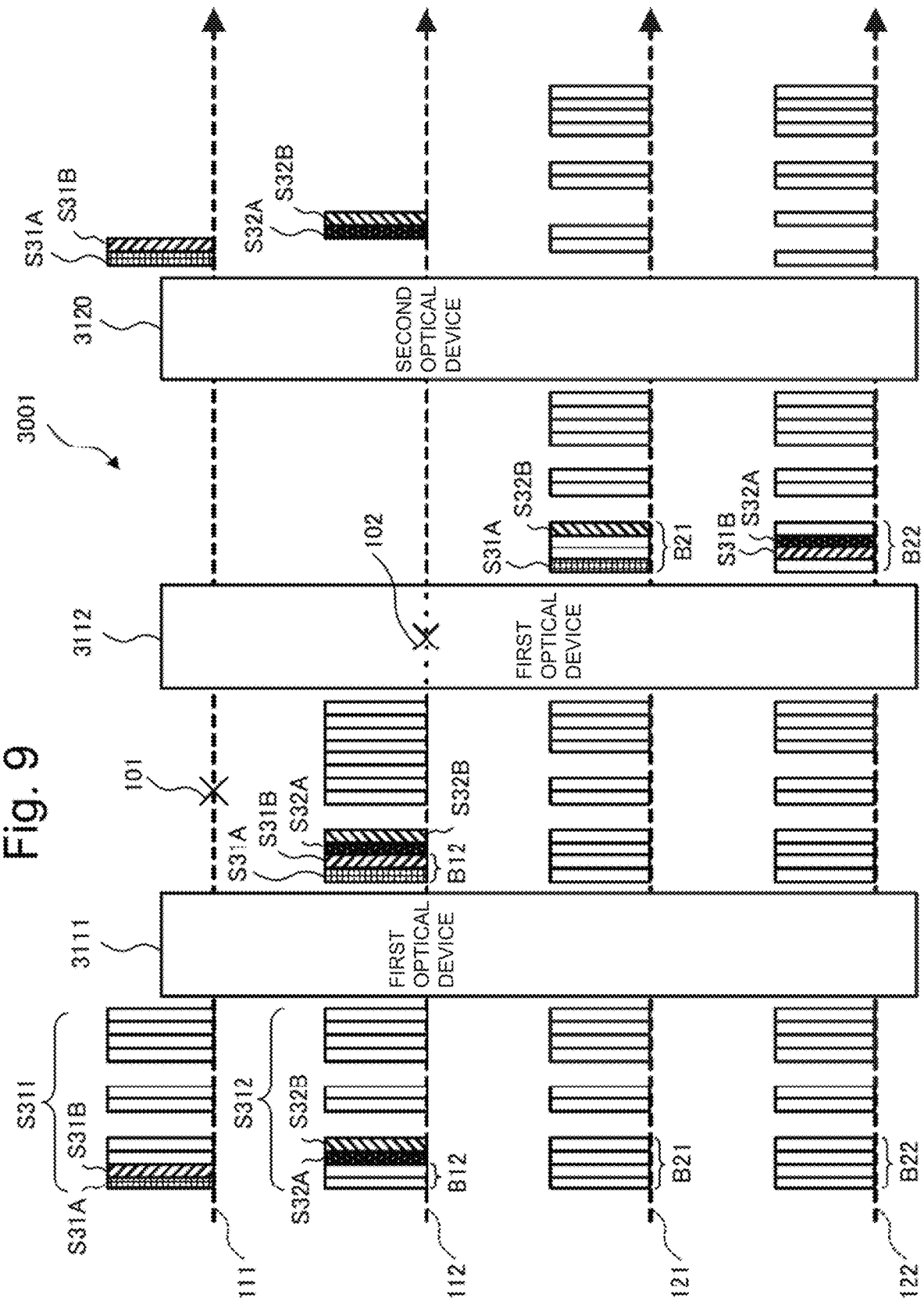

OPTICAL TRANSMISSION SYSTEM, OPTICAL DEVICE, AND OPTICAL TRANSMISSION METHOD

This application is a National Stage Entry of PCT/JP2021/007475 filed on Feb. 26, 2021, which claims priority from Japanese Patent Application 2020-041096 filed on Mar. 10, 2020, the contents of all of which are incorporated herein by reference, in their entirety.

TECHNICAL FIELD

The present invention relates to an optical transmission system, an optical device, and an optical transmission method, and particularly, relates to an optical transmission system, an optical device, and an optical transmission method that are used for an optical submarine cable transmission system.

BACKGROUND ART

An optical submarine cable transmission system linking continents with an optical fiber serves an important role as an infrastructure that supports an international communication network. The optical submarine cable transmission system is constituted of a submarine cable that accommodates an optical fiber, a submarine repeater in which an optical amplifier is installed, a submarine branching device that branches an optical signal, a terminal station device placed in a landing station, and the like. The terminal station device includes wavelength multiplexing equipment (WME), submarine line termination equipment (SLTE), a system monitoring device, and the like.

Since communication with large-voltage traffic is performed in the optical submarine cable transmission system, importance of a technique for recovering, at a high speed, from a communication failure occurring owing to breaking of an optical fiber, a fault of a submarine device, or the like has been increasing. One example of a failure recovery technique in such an optical submarine cable transmission system is described in PTL 1.

A related optical submarine cable system described in PTL 1 has a configuration in which related optical devices are connected in a mesh shape by a submarine cable. The related optical device includes an optical add/drop circuit, an optical path break detector, and an optical distributor. Then, when disappearance of an optical signal is detected, the related optical device changes setting of the optical add/drop circuit in such a way as to detour a section of the disappearance. Specifically, the related optical submarine cable system has a configuration that switches a route per submarine cable and sets a detour when a failure occurs on a path.

As related techniques, there are techniques described in PTLs 2 and 3.

CITATION LIST

Patent Literature

[PTL 1] International Publication No. WO2014/006861
[PTL 2] Japanese Unexamined Patent Application Publication (Translation of PCT Application) No. 2019-517169
[PTL 3] Japanese Unexamined Patent Application Publication No. 2009-088606

SUMMARY OF INVENTION

Technical Problem

In recent years, due to spread of a cloud service, communication traffic among data centers (DC) placed worldwide has been increasing. Accordingly, a cloud operator or the like other than a telecommunication operator has come to directly invest in an optical submarine cable transmission system. As a result, there arises a case where a user differs for each optical fiber accommodated in a submarine cable or for each wavelength band of an optical fiber.

In a submarine branching device as well, a reconfigurable optical add/drop multiplexer (ROADM) function of switching a path of an optical signal per wavelength is introduced, and a wavelength selectable switch (WSS) is installed. Thus, there may be a case where a failure such as communication disconnection or transmission quality deterioration occurs in only a part of wavelength bands due to a fault of the wavelength selectable switch (WSS) or the like.

In such a case, the following problem arises when a route is switched per optical cable or switched per optical fiber accommodated in an optical cable as in the above-described related optical submarine cable system, in order to accomplish failure recovery.

When a failure occurs in a part of a plurality of optical fibers within an optical cable, switching an optical cable (path) to a redundant configuration results in switching an optical cable (path) including an optical fiber in which no failure occurs as well. This varies an optical transmission condition, and involves a change of an optical transmission device provided in a terminal station device. This is an unnecessary change for another user utilizing an optical fiber in which no failure occurs, and causes a problem that stable utilization of an optical transmission system is impaired. Since an optical fiber in which no failure occurs is usable but is not used any more, a problem arises that effective utilization of a wavelength band of the optical fiber is not able to be accomplished.

Further, when a failure occurs in a part of wavelength bands of an optical fiber, switching to a redundant configuration per optical fiber accommodated in an optical cable results in switching an optical fiber for an optical signal on a normal wavelength band as well. This involves a change of an optical transmission device provided in a terminal station device. In this case as well, the change is an unnecessary change for another user utilizing a normal wavelength band, and a problem arises that stable utilization of an optical transmission system is impaired. Since a normal wavelength band of an optical fiber is usable but is not used any more, a problem arises that effective utilization of the wavelength band is not able to be accomplished.

Thus, there is a problem that, when a failure occurs in a part of an optical fiber within an optical cable, switching to a redundant configuration impairs stable utilization of an optical transmission system, and effective utilization of a wavelength band is not able to be accomplished.

An object of the present invention is to provide an optical transmission system, an optical device, an optical network management device, and an optical transmission method that solve the problem described above.

Solution to Problem

An optical transmission system according to the present invention includes: a first optical device configured to change a transmission line of a wavelength band signal propagating through a first optical transmission line to a second optical transmission line being the same path as the first optical transmission line, in a stage before a failure part in the first optical transmission line; and a second optical device configured to change the transmission line of the wavelength band signal from the second optical transmission line to the first optical transmission line, in a stage after the failure part.

An optical device according to the present invention includes: a switching means for performing either first switching processing or second switching processing; an input connection means for connecting each of a first optical transmission line and a second optical transmission line being the same path as the first optical transmission line, to an input side of the switching means; and an output connection means for connecting each of the first optical transmission line and the second optical transmission line, to an output side of the switching means, wherein the first switching processing is processing of changing a transmission line of a wavelength band signal propagating through the first optical transmission line to the second optical transmission line, in a stage before a failure part in the first optical transmission line, and the second switching processing is processing of changing the transmission line of the wavelength band signal from the second optical transmission line to the first optical transmission line, in a stage after the failure part.

An optical network management device according to the present invention includes: a monitoring means for monitoring occurrence of a failure in a first optical transmission line, and generating, when occurrence of a failure is detected, failure occurrence information; and a control means for, based on the failure occurrence information, instructing a first optical device being located in a stage before a part where the failure has occurred, to change a transmission line of a wavelength band signal propagating through the first optical transmission line to a second optical transmission line being the same path as the first optical transmission line, and instructing a second optical device being located in a stage after the part where the failure has occurred, to change the transmission line of the wavelength band signal from the second optical transmission line to the first optical transmission line.

An optical transmission method according to the present invention includes: changing a transmission line of a wavelength band signal propagating through a first optical transmission line to a second optical transmission line being the same path as the first optical transmission line, in a stage before a failure part in the first optical transmission line; and changing the transmission line of the wavelength band signal from the second optical transmission line to the first optical transmission line, in a stage after the failure part.

An optical transmission method according to the present invention includes: causing a first wavelength multiplexing optical signal to propagate through a first optical transmission line; causing a second wavelength multiplexing optical signal to propagate through a second optical transmission line being the same path as the first optical transmission line; and when a failure occurs in the first optical transmission line, stopping propagation of the second wavelength multiplexing optical signal in a stage before a part where the failure has occurred, changing a transmission line of a wavelength band signal constituting the first wavelength multiplexing optical signal to the second optical transmission line, and changing the transmission line of the wavelength band signal from the second optical transmission line to the first optical transmission line, in a stage after the part where the failure has occurred.

Advantageous Effects of Invention

An optical transmission system, an optical device, an optical network management device, and an optical transmission method according to the present invention are able to accomplish failure recovery while effectively utilizing a wavelength band without impairing stable utilization of the optical transmission system, even when a failure occurs in a part of an optical fiber within an optical cable.

BRIEF DESCRIPTION OF DRAWINGS

FIG. 9 is a diagram for describing another operation of the optical transmission system according to the third example embodiment of the present invention.

EXAMPLE EMBODIMENT

Hereinafter, example embodiments according to the present invention are described with reference to the drawings.

FIRST EXAMPLE EMBODIMENT

Figure 1:
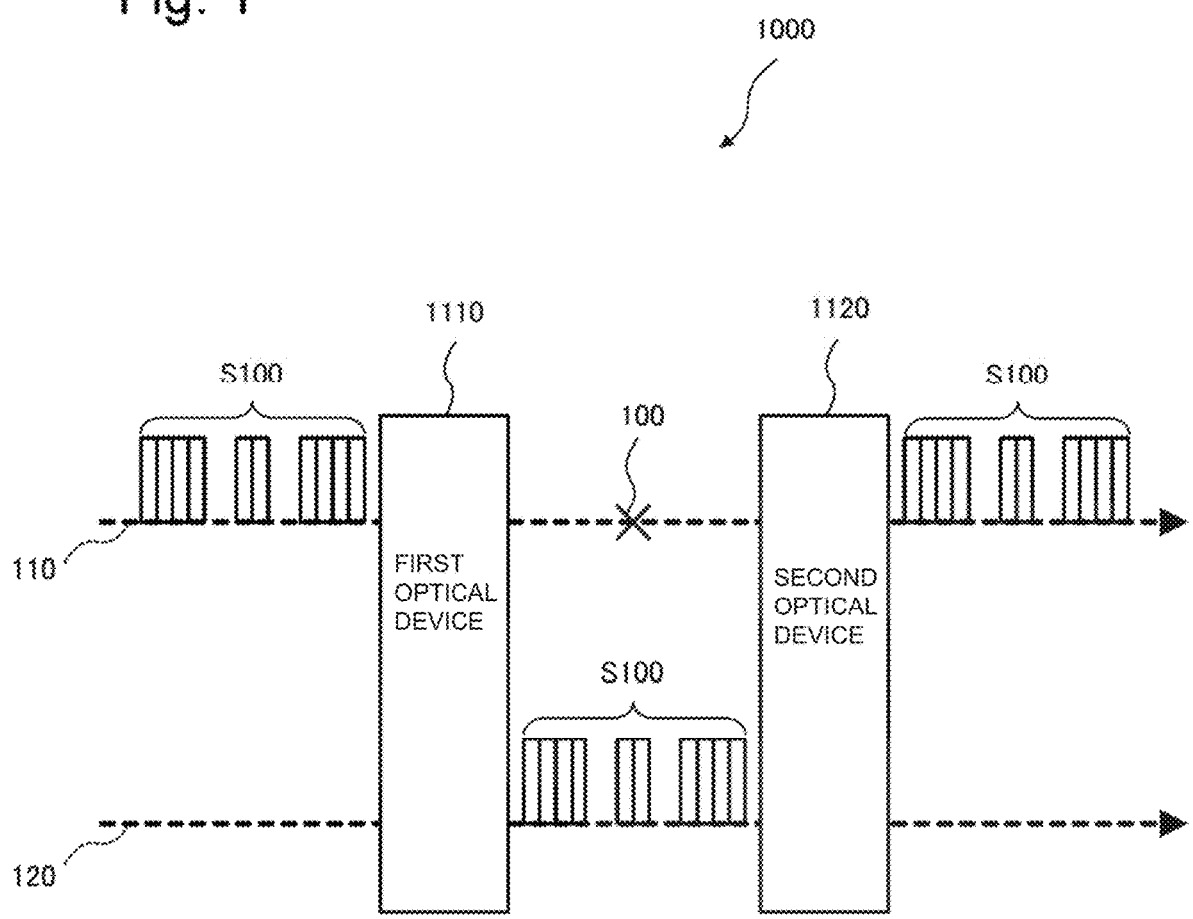
FIG. 1 is a block diagram illustrating a configuration of an optical transmission system according to a first example embodiment of the present invention.

FIG. 1 is a block diagram illustrating a configuration of an optical transmission system 1000 according to a first example embodiment of the present invention. The optical transmission system 1000 includes a first optical device 1110 and a second optical device 1120.

The first optical device 1110 changes a transmission line of a wavelength band signal S100 propagating through a first optical transmission line 110 to a second optical transmission line 120 being the same path as the first optical transmission line 110, in a stage before a failure part 100 in the first optical transmission line 110. The second optical device 1120 changes the transmission line of the wavelength band signal S100 from the second optical transmission line 120 to the first optical transmission line 110, in a stage after the failure part 100.

With such a configuration, according to the optical transmission system 1000 in the present example embodiment, the wavelength band signal S100 propagates in such a way as to detour the failure part 100 only between the first optical device 1110 and the second optical device 1120. Thus, a change of an optical transmission device included in a terminal station device connected to the first optical device 1110 and the second optical device 1120 is unnecessary.

Specifically, the optical transmission system 1000 has a configuration in which, after the first optical device 1110 switches a transmission line of the wavelength band signal S100, the second optical device 1120 again switches in such a way as to return to the original transmission line. Thus, the wavelength band signal S100 is not located on another transmission line side in a terminal station device, by detouring the failure part 100. As a result, even when users of the first optical transmission line 110 and the second optical transmission line 120 differ, security of the users is able to be assured.

Thus, the optical transmission system 1000 is able to accomplish failure recovery without impairing stable utilization of the optical transmission system.

As described above, in the optical transmission system 1000, the first optical device 1110 switches from the first optical transmission line 110 to the second optical transmission line 120 in a stage before the failure part 100 in the first optical transmission line 110. Then, the second optical device 1120 again switches in such a way as to return to the first optical transmission line 110 in a stage after the failure part 100. Thus, in a stage before the first optical device 1110 and in a stage after the second optical device 1120, the second optical transmission line 120 to be a detour of the failure part 100 is able to be used as a transmission line of another wavelength band signal. As a result, failure recovery is able to be accomplished while a wavelength band is effectively utilized.

Herein, the first optical transmission line 110 and the second optical transmission line 120 are each typically configured by an optical fiber. The first optical transmission line 110 and the second optical transmission line 120 are able to be the same path, for example, by being accommodated in the same optical cable. Each of the first optical transmission line 110 and the second optical transmission line 120 is, for example, an optical fiber for an uplink line, and may each constitute a fiber pair (FP) together with an optical fiber for a downlink line (not illustrated).

The first optical transmission line 110 may be an operational optical fiber through which an operational optical signal propagates, and the second optical transmission line 120 may be a reserve (spare) optical fiber for detouring at failure occurrence. Note that, at a normal time (other than failure occurrence), it is possible to increase a transmission capacity by using the second optical transmission line 120 as an operational optical fiber.

Figure 2:
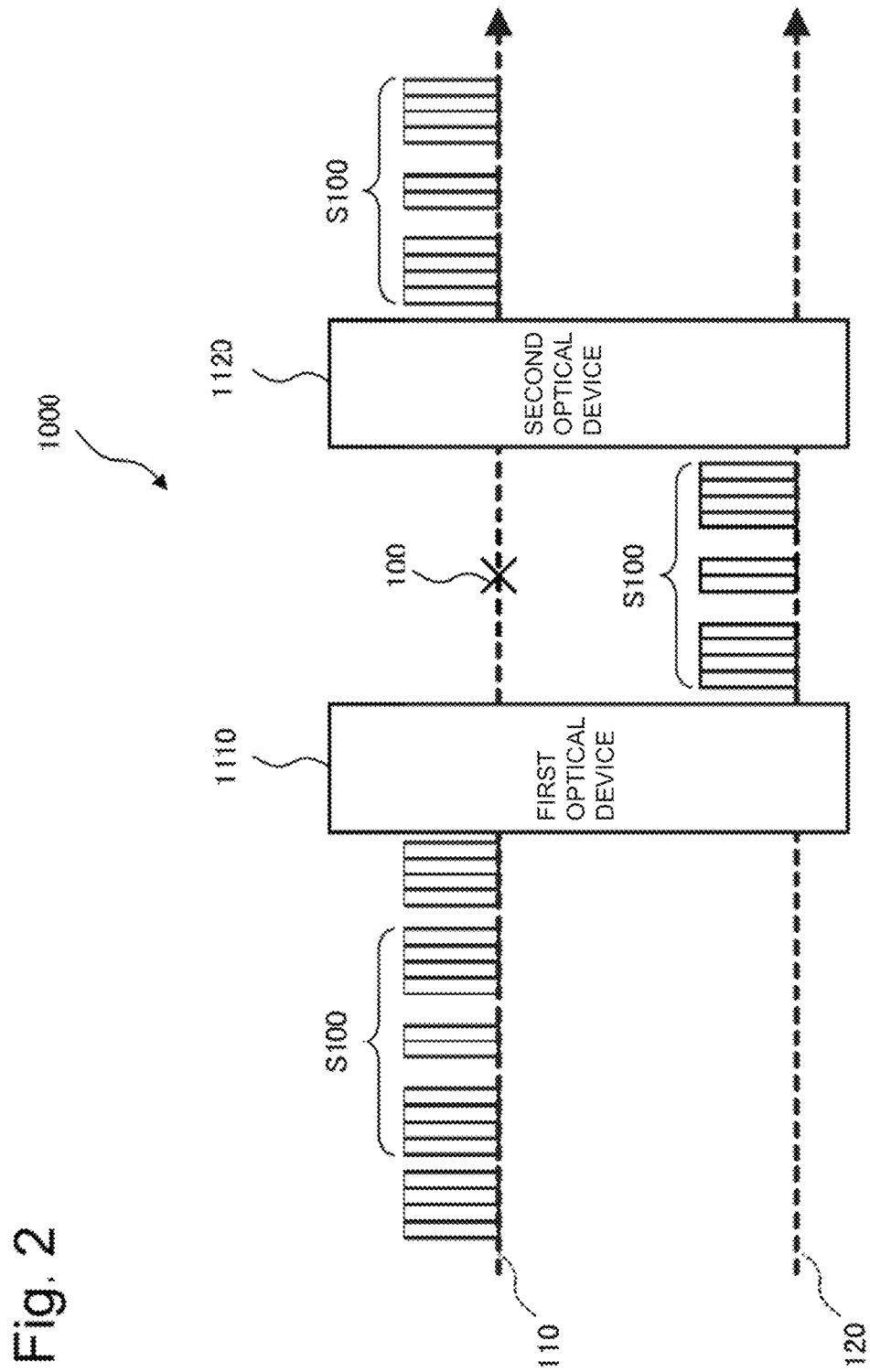
FIG. 2 is a block diagram illustrating a configuration of the optical transmission system according to the first example embodiment of the present invention, and is a diagram illustrating a case where, in addition to a wavelength band signal, another wavelength band signal propagates through a first optical transmission line.

Although only the wavelength band signal S100 is illustrated in FIG. 1, there may be a case where, in addition to the wavelength band signal S100, another wavelength band signal propagates through the first optical transmission line 110, as illustrated in FIG. 2. For example, the wavelength band signal S100 may be at least a part of a plurality of wavelength band signals constituting a wavelength division multiplexing (WDM) optical signal.

When the first optical transmission line 110 includes a plurality of first optical fibers, and a failure occurs in a plurality of the first optical fibers, the first optical device 1110 is able to have a configuration that operates as follows.

Specifically, the first optical device 1110 determines a priority optical fiber among a plurality of the first optical fibers, based on priority degrees of a plurality of the first optical fibers. Then, the first optical device 1110 changes the transmission line of the wavelength band signal S100 propagating through the priority optical fiber to the second optical transmission line 120. Herein, the first optical device 1110 is able to determine, among a plurality of the first optical fibers, a first optical fiber in which signal disconnection is detected earliest, to be a priority optical fiber as an optical fiber being high in priority degree. Without being limited thereto, a previously set first optical fiber being high in priority degree may be determined as a priority optical fiber.

When the second optical transmission line 120 includes a plurality of second optical fibers, the first optical device 1110 is able to have a configuration that operates as follows.

Specifically, the first optical device 1110 determines a low priority optical fiber being low in priority degree among a plurality of the second optical fibers, based on priority degrees of a plurality of the second optical fibers, and changes the transmission line of the wavelength band signal S100 to the low priority optical fiber. In this case, it is possible to accomplish failure recovery without providing, as the second optical transmission line 120, a reserve (spare) optical fiber for detouring at failure occurrence.

Figure 3:
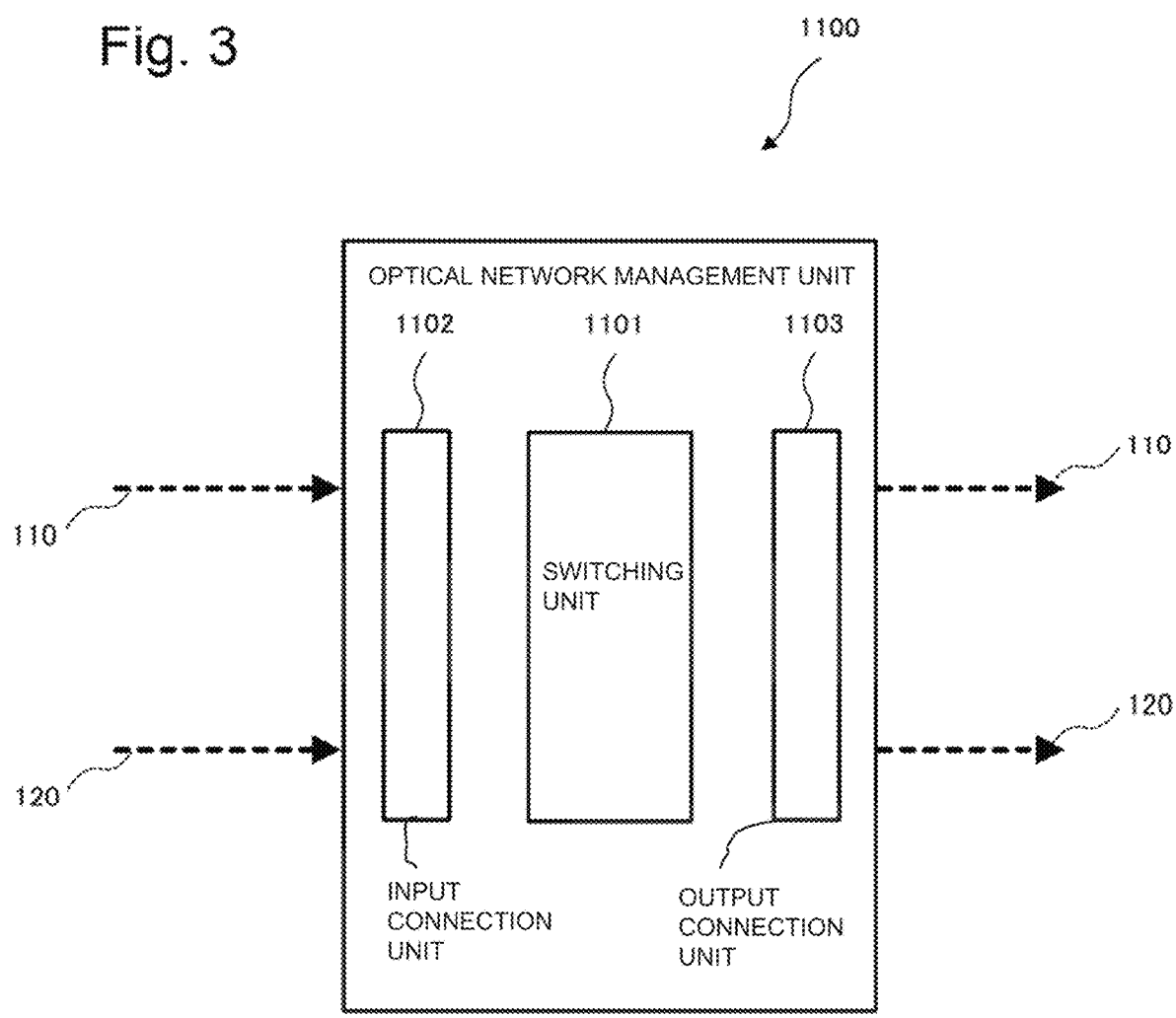
FIG. 3 is a block diagram illustrating a configuration of an optical device according to the first example embodiment of the present invention.

Next, an optical device according to the present example embodiment is described. FIG. 3 illustrates a configuration of an optical device 1100 according to the present example embodiment.

The optical device 1100 according to the present example embodiment includes a switching unit (switching means) 1101 for performing either first switching processing or second switching processing, an input connection unit (input connection means) 1102, and an output connection unit (output connection means) 1103. The input connection unit 1102 connects each of the first optical transmission line 110, and the second optical transmission line 120 being the same path as the first optical transmission line 110, to an input side of the switching unit (switching means) 1101. The output connection unit 1103 connects each of the first optical transmission line 110 and the second optical transmission line 120 to an output side of the switching unit (switching means) 1101.

Herein, the first switching processing is processing of changing a transmission line of a wavelength band signal propagating through the first optical transmission line 110 to the second optical transmission line 120, in a stage before a failure part in the first optical transmission line 110. The second switching processing is processing of changing the transmission line of the wavelength band signal from the second optical transmission line 120 to the first optical transmission line, in a stage after the failure part.

The switching unit 1101 is able to typically have a configuration including a wavelength selectable switch (WSS). Note that, the optical device 1100 includes submarine equipment used in an optical submarine cable transmission system, such as an optical branching device, a transmission device, and a repeater device.

The optical device 1100 is able to have a configuration further including a control unit (control means) that determines a priority optical fiber among a plurality of first optical fibers included in the first optical transmission line 110, based on priority degrees of a plurality of the first optical fibers. In this case, in the first switching processing, the switching unit 1101 changes a transmission line of a wavelength band signal propagating through the priority optical fiber to the second optical transmission line 120.

The control unit (control means) may determine a low priority optical fiber among a plurality of second optical fibers included in the second optical transmission line 120, based on priority degrees of a plurality of the second optical fibers. In this case, in the first switching processing, the switching unit 1101 changes the transmission line of the wavelength band signal to the low priority optical fiber.

Figure 4:
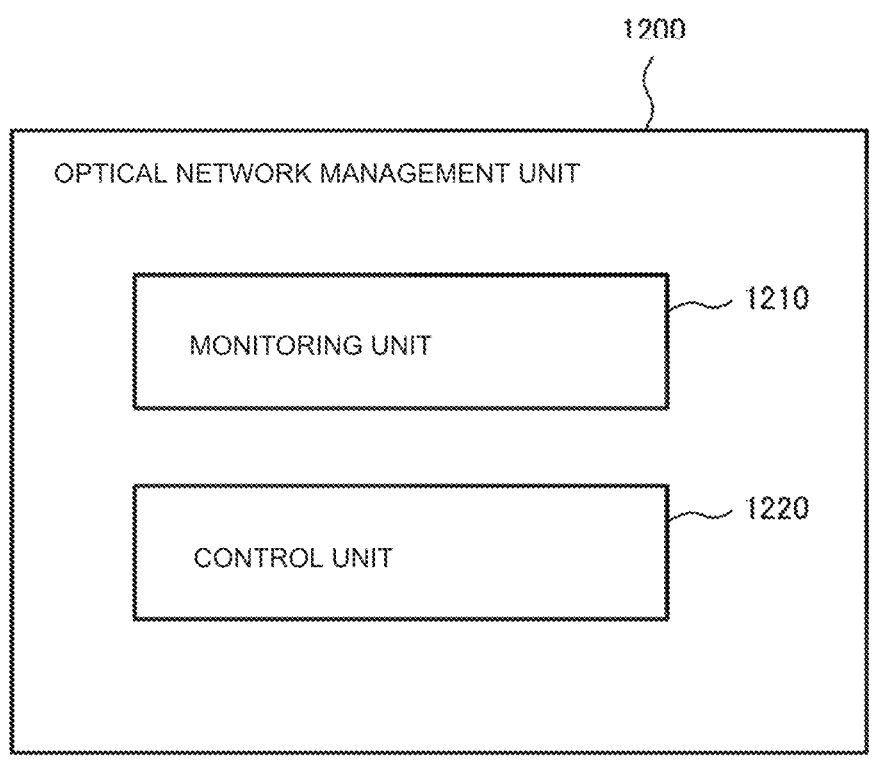
FIG. 4 is a block diagram illustrating a configuration of an optical network management device according to the first example embodiment of the present invention.

Next, an optical network management device according to the present example embodiment is described. FIG. 4 illustrates a configuration of an optical network management device 1200 according to the present example embodiment.

The optical network management device 1200 includes a monitoring unit (monitoring means) 1210 and a control unit (control means) 1220.

The monitoring unit 1210 monitors occurrence of a failure in a first optical transmission line, and, when occurrence of a failure is detected, generates failure occurrence information. The control unit 1220 instructs, based on the failure occurrence information, a first optical device being located in a stage before a part where the failure has occurred, to change a transmission line of a wavelength band signal propagating through the first optical transmission line to a second optical transmission line being the same path as the first optical transmission line. The control unit 1220 further instructs a second optical device being located in a stage after the part where the failure has occurred to change the transmission line of the wavelength band signal from the second optical transmission line to the first optical transmission line.

Next, an optical transmission method according to the present example embodiment is described.

In the optical transmission method according to the present example embodiment, first, a transmission line of a wavelength band signal propagating through a first optical transmission line is changed to a second optical transmission line being the same path as the first optical transmission line, in a stage before a failure part in the first optical transmission line. Then, the transmission line of the wavelength band signal is changed from the second optical transmission line to the first optical transmission line, in a stage after the failure part.

Herein, the above-described processing of changing a transmission line to the second optical transmission line may include the following processing. Specifically, a priority optical fiber is determined among a plurality of first optical fibers included in the first optical transmission line, based on priority degrees of a plurality of the first optical fibers, and a transmission line of a wavelength band signal propagating through the priority optical fiber is changed to the second optical transmission line.

When the above-described transmission line is changed to the second optical transmission line, a low priority optical fiber may be determined among a plurality of second optical fibers included in the second optical transmission line, based on priority degrees of a plurality of the second optical fibers, and the transmission line of the wavelength band signal may be changed to the low priority optical fiber.

In another optical transmission method according to the present example embodiment, first, a first wavelength multiplexing optical signal is caused to propagate through a first optical transmission line, and a second wavelength multiplexing optical signal is caused to propagate through a second optical transmission line being the same path as the first optical transmission line. Then, when a failure occurs in the first optical transmission line, propagation of the second wavelength multiplexing optical signal is stopped in a stage before a part where the failure has occurred, and a transmission line of a wavelength band signal constituting the first wavelength multiplexing optical signal is changed to the second optical transmission line. Further, the transmission line of the wavelength band signal is changed from the second optical transmission line to the first optical transmission line, in a stage after the part where the failure has occurred.

As described above, the optical transmission system 1000, the optical device 1100, the optical network management device 1200, and the optical transmission method according to the present example embodiment are able to accomplish failure recovery while effectively utilizing a wavelength band without impairing stable utilization of the optical transmission system, even when a failure occurs in a part of an optical fiber within an optical cable.

SECOND EXAMPLE EMBODIMENT

Figure 5:
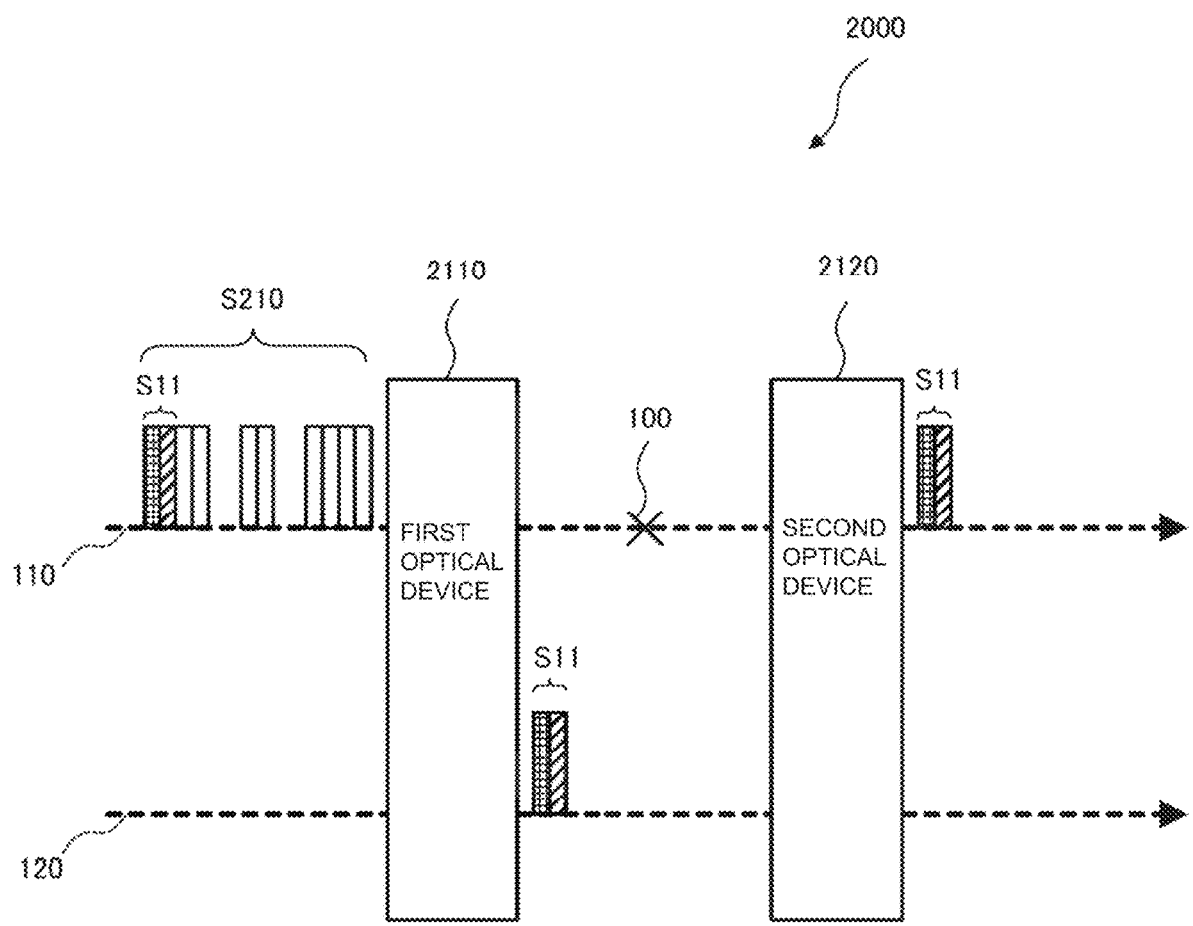
FIG. 5 is a diagram for describing an operation of an optical transmission system according to a second example embodiment of the present invention.

Next, a second example embodiment of the present invention is described. As illustrated in FIG. 5, a configuration of an optical transmission system 2000 according to the present example embodiment is similar to a configuration of the optical transmission system 1000 according to the first example embodiment, and includes a first optical device 2110 and a second optical device 2120.

The first optical device 2110 changes a transmission line of a wavelength band signal propagating through a first optical transmission line 110 to a second optical transmission line 120 being the same path as the first optical transmission line 110, in a stage before a failure part 100 in the first optical transmission line 110. In this instance, the first optical device 2110 according to the present example embodiment determines a priority band signal S11 as a wavelength band signal among a plurality of first wavelength band signals constituting a first wavelength multiplexing optical signal S210 propagating through the first optical transmission line 110, based on priority degrees of a plurality of the first wavelength band signals. Then, the first optical device 2110 changes the transmission line of the priority band signal S11 to the second optical transmission line 120.

The second optical device 2120 changes the transmission line of the priority band signal S11 from the second optical transmission line 120 to the first optical transmission line 110, in a stage after the failure part 100.

Herein, a priority degree is able to be defined by a plurality of priority degree levels, for example, three stages of low, medium, and high, or five stages of 1, 2, 3, 4, and 5, or the like. Then, the first optical device 2110 is able to have, for example, a configuration that prioritizes a wavelength band signal being higher in priority degree level, and changes a transmission line thereof. Without being limited thereto, the first optical device 2110 may prioritize a wavelength band signal at a moderate priority degree level, and change a transmission line thereof. In this way, among a plurality of first wavelength band signals constituting the first wavelength multiplexing optical signal S210, an order of changing a transmission line is able to be determined based on a priority degree.

Herein, only the priority band signal S11 determined based on a priority degree propagates through the second optical transmission line 120. Thus, even in a section (between the first optical device 2110 and the second optical device 2120) being associated with the failure part 100, the second optical transmission line 120 is able to be used as a transmission signal band, on a wavelength band other than a wavelength band occupied by the priority band signal S11. As a result, failure recovery is able to be accomplished while a wavelength band is more effectively utilized.

Figure 6:
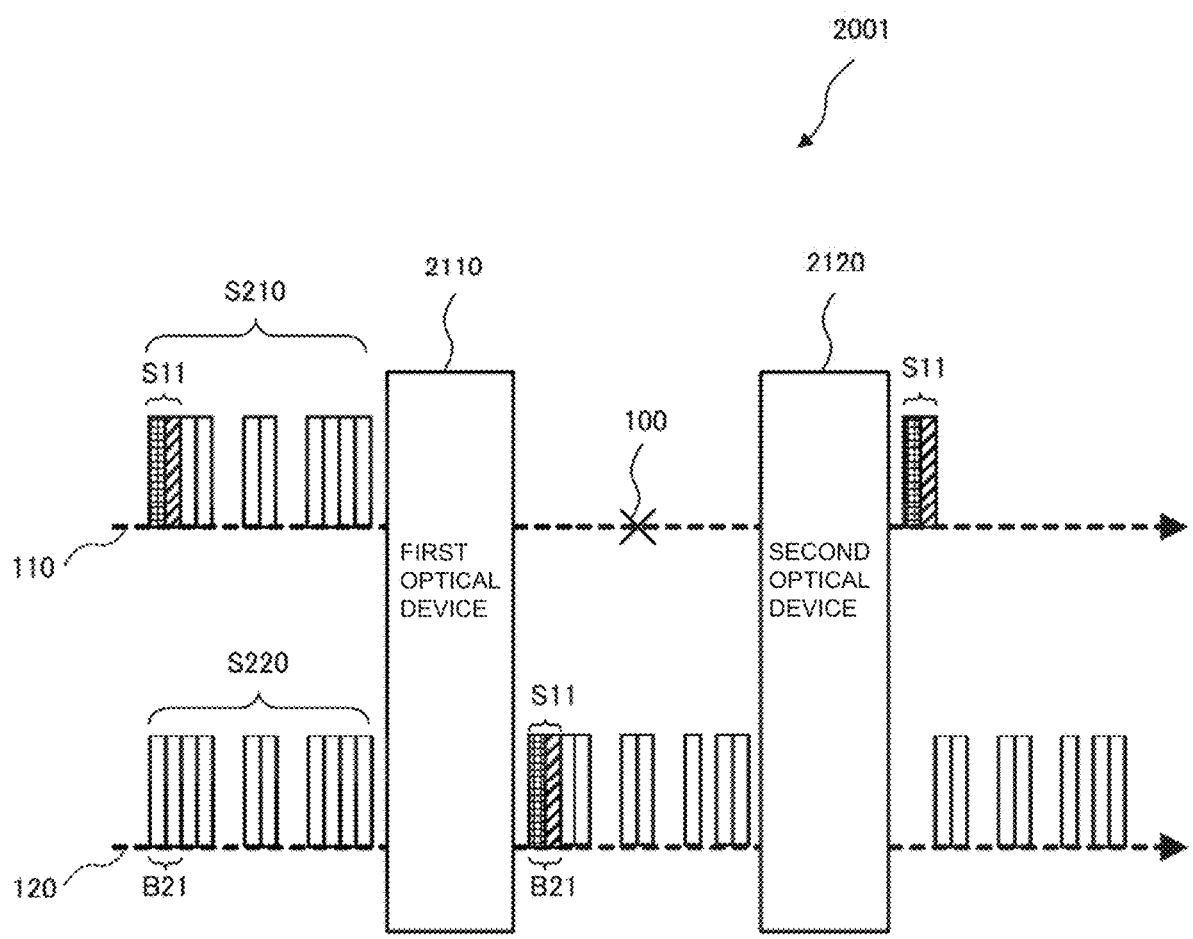
FIG. 6 is a diagram for describing another operation of the optical transmission system according to the second example embodiment of the present invention.

As in an optical transmission system 2001 illustrated in FIG. 6, the first optical device 2110 is able to have a configuration in which a wavelength band signal propagating through the first optical transmission line 110 is located in a part of a wavelength band of a second wavelength multiplexing optical signal S220 propagating through the second optical transmission line 120. In this case, the first optical device 2110 determines a low priority band B21 among second wavelength bands each occupied by each of a plurality of second wavelength band signals constituting the second wavelength multiplexing optical signal S220 propagating through the second optical transmission line 120, based on priority degrees of a plurality of the second wavelength band signals. Then, the first optical device 2110 is able to have a configuration in which a wavelength band signal propagating through the first optical transmission line 110 is located in the low priority band B21 being low in priority degree. FIG. 6 illustrates an example in which the above-described priority band signal S11 is located in the low priority band B21 as a wavelength band signal.

Note that, it is assumed that a low priority band includes an unused band that is not occupied by the second wavelength band signal constituting the second wavelength multiplexing optical signal S220.

As described above, each of the optical transmission systems 2000 and 2001 according to the present example embodiment has a configuration in which, after the first optical device 2110 switches a transmission line of the priority band signal S11, the second optical device 2120 again switches in such a way as to return to the original transmission line. Thus, the priority band signal S11 is not located on another transmission line side in a terminal station device, by detouring the failure part 100. As a result, even when users of the first optical transmission line 110 and the second optical transmission line 120 differ, security of the users is able to be assured.

Thus, each of the optical transmission systems 2000 and 2001 is able to accomplish failure recovery without impairing stable utilization of the optical transmission system.

Next, an optical device according to the present example embodiment is described. A configuration of the optical device according to the present example embodiment is similar to a configuration of the optical device 1100 according to the first example embodiment illustrated in FIG. 3.

Specifically, the optical device according to the present example embodiment includes a switching unit 1101 for performing either first switching processing or second switching processing, an input connection unit 1102, and an output connection unit 1103. The input connection unit 1102 connects each of the first optical transmission line 110, and the second optical transmission line 120 being the same path as the first optical transmission line 110, to an input side of the switching unit 1101. The output connection unit 1103 connects each of the first optical transmission line 110 and the second optical transmission line 120 to an output side of the switching unit 1101.

Herein, the first switching processing is processing of changing a transmission line of a wavelength band signal propagating through the first optical transmission line 110 to the second optical transmission line 120, in a stage before a failure part in the first optical transmission line 110. The second switching processing is processing of changing the transmission line of the wavelength band signal from the second optical transmission line 120 to the first optical transmission line, in a stage after the failure part.

The optical device according to the present example embodiment has a configuration further including a control unit (control means) that determines a priority band signal as a wavelength band signal among a plurality of first wavelength band signals constituting a first wavelength multiplexing optical signal propagating through the first optical transmission line 110, based on priority degrees of a plurality of the first wavelength band signals. In this case, in the first switching processing, the switching unit 1101 changes a transmission line of the priority band signal to the second optical transmission line 120.

The control unit (control means) may determine a low priority band among second wavelength bands each occupied by each of a plurality of second wavelength band signals constituting a second wavelength multiplexing optical signal propagating through the second optical transmission line 120, based on priority degrees of a plurality of the second wavelength band signals. In this case, in the first switching processing, the switching unit 1101 locates a wavelength band signal in a low priority band being low in priority degree. Note that, it is assumed that a low priority band includes an unused band that is not occupied by the second wavelength band signal constituting the second wavelength multiplexing optical signal.

Next, an optical transmission method according to the present example embodiment is described.

In the optical transmission method according to the present example embodiment, first, a transmission line of a wavelength band signal propagating through a first optical transmission line is changed to a second optical transmission line being the same path as the first optical transmission line, in a stage before a failure part in the first optical transmission line. Then, the transmission line of the wavelength band signal is changed from the second optical transmission line to the first optical transmission line, in a stage after the failure part.

In the optical transmission method according to the present example embodiment, a configuration is provided in which the processing of changing a transmission line to the second optical transmission line includes the following processing. Specifically, a priority band signal as a wavelength band signal is determined among a plurality of first wavelength band signals constituting a first wavelength multiplexing optical signal propagating through the first optical transmission line, based on priority degrees of a plurality of the first wavelength band signals, and a transmission line of the priority band signal is changed to the second optical transmission line.

The above-described processing of changing a transmission line to the second optical transmission line may include the following processing. Specifically, a low priority band may be determined among second wavelength bands each occupied by each of a plurality of second wavelength band signals constituting a second wavelength multiplexing optical signal propagating through the second optical transmission line, based on priority degrees of a plurality of the second wavelength band signals, and a wavelength band signal may be located in the low priority band. Note that, it is assumed that a low priority band includes an unused band that is not occupied by the second wavelength band signal constituting the second wavelength multiplexing optical signal.

As described above, each of the optical transmission systems 2000 and 2001, the optical device, and the optical transmission method according to the present example embodiment are able to accomplish failure recovery while effectively utilizing a wavelength band without impairing stable utilization of the optical transmission system, even when a failure occurs in a part of an optical fiber within an optical cable.

THIRD EXAMPLE EMBODIMENT

Next, a third example embodiment of the present invention is described. A configuration of an optical transmission system 3000 according to the present example embodiment is similar to a configuration of the optical transmission system 1000 according to the first example embodiment.

Figure 7:
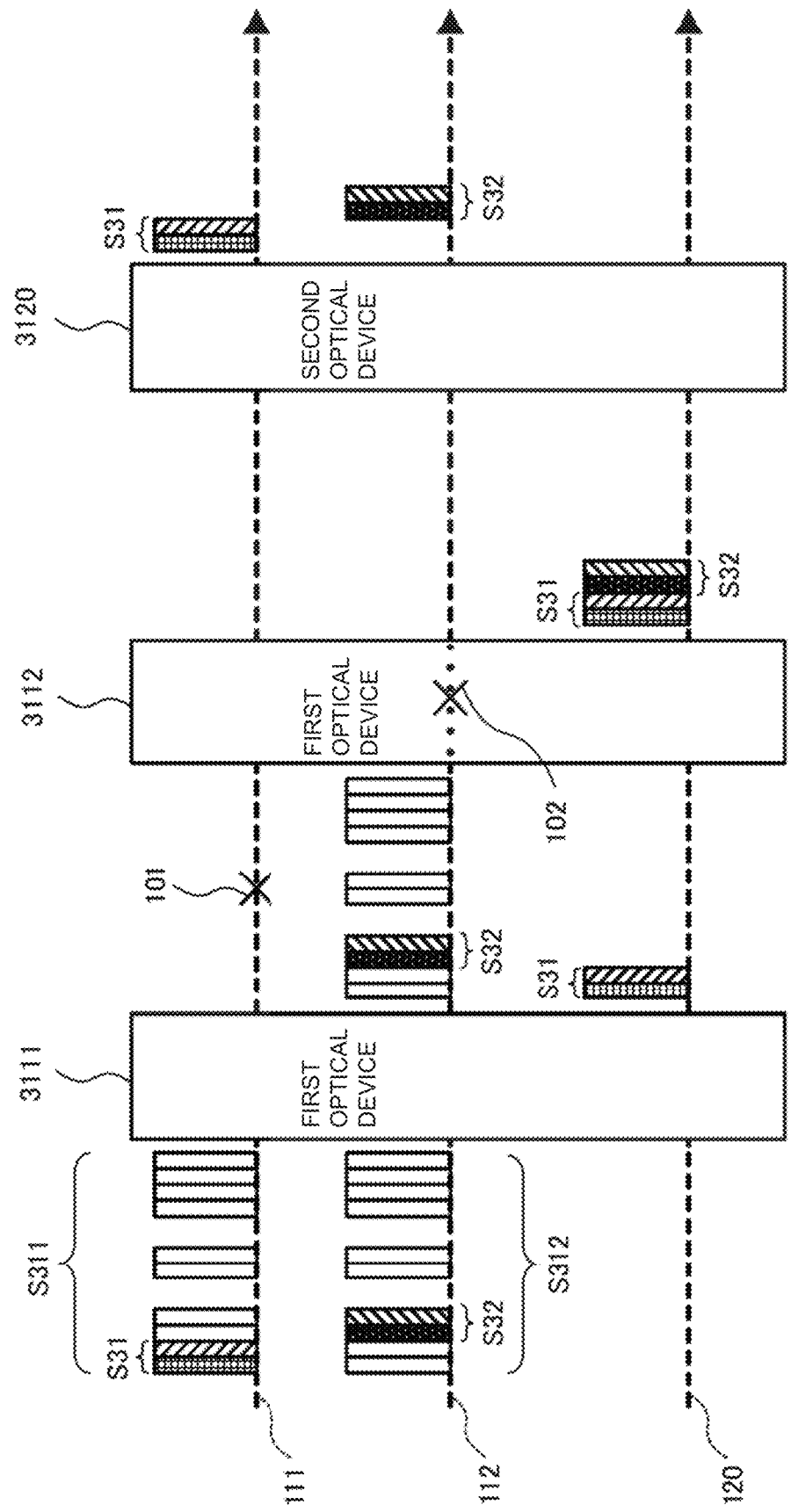
FIG. 7 is a diagram for describing an operation of an optical transmission system according to a third example embodiment of the present invention.
Figure 8:
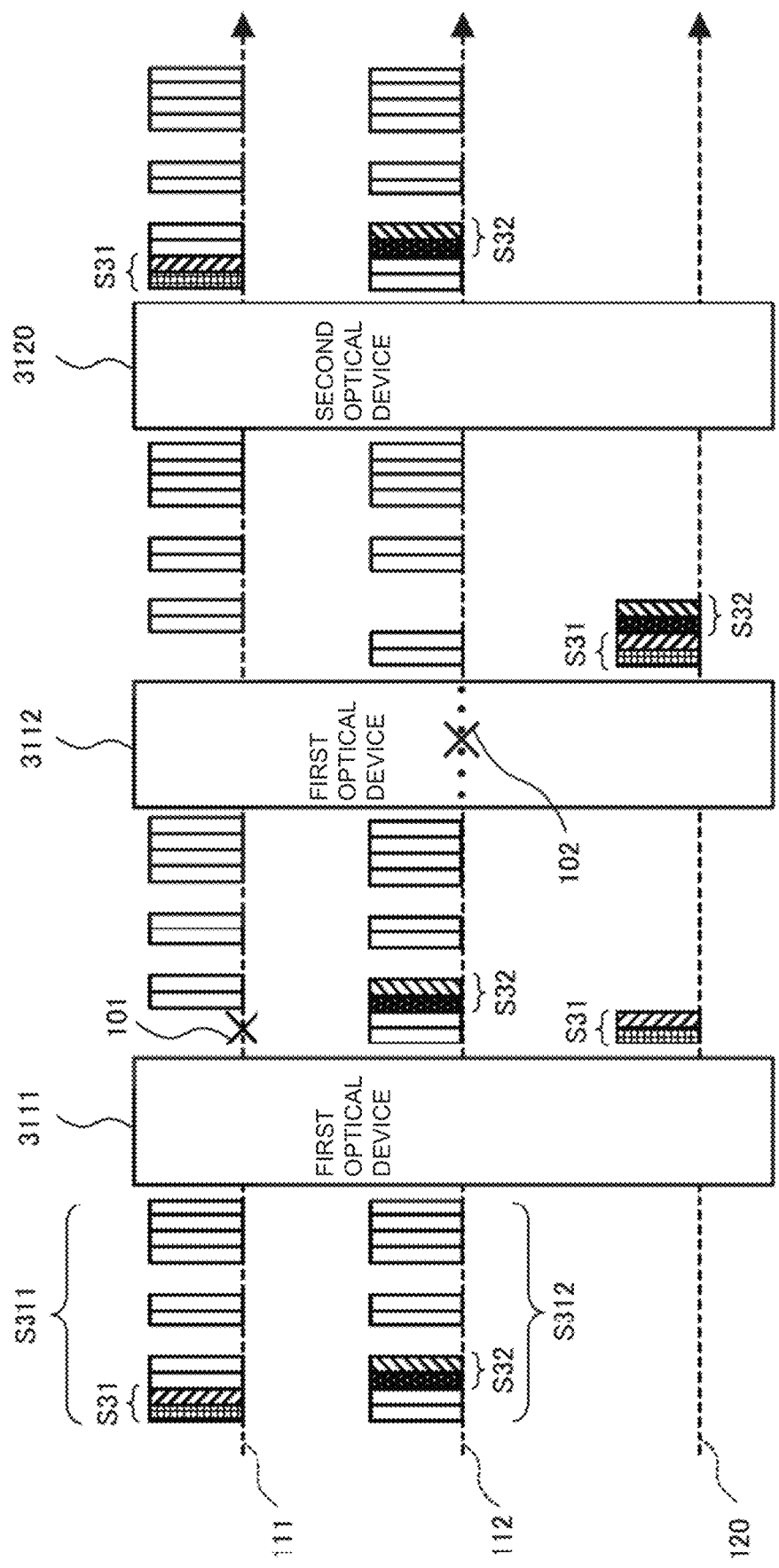
FIG. 8 is a diagram for describing an operation of the optical transmission system according to the third example embodiment of the present invention, and is a diagram illustrating a case where a failure such as communication disconnection or transmission quality deterioration occurs in only a part of a wavelength band.

In the present example embodiment, as illustrated in FIG. 7, a case is described as an example where the optical transmission system 3000 includes a first optical device 3111 and a first optical device 3112 as first optical devices, and a second optical device 3120. A description is given assuming that a first optical transmission line includes a plurality of first optical fibers 111 and 112, and a failure part 101 is present on the first optical fiber 111 between the first optical device 3111 and the first optical device 3112, and a failure part 102 is present within the first optical device 3112. Note that, a case is also included where a failure such as communication disconnection or transmission quality deterioration occurs in only a part of a wavelength band in the failure part 101 and the failure part 102, as illustrated in FIG. 8.

The first optical device 3111 changes a transmission line of a wavelength band signal propagating through the first optical fiber 111 to a second optical transmission line 120 being the same path as the first optical fiber 111, in a stage before the failure part 101 in the first optical fiber 111 as a first optical transmission line. The first optical device 3112 changes a transmission line of a wavelength band signal propagating through the first optical fiber 112 to the second optical transmission line 120 being the same path as the first optical fiber 112, in a stage before the failure part 102 in the first optical fiber 112 as a first optical transmission line.

The second optical device 3120 changes the transmission line of the wavelength band signal from the second optical transmission line to the first optical fiber 111 and the first optical fiber 112 as first optical transmission lines, in stages after the failure part 101 and the failure part 102.

Herein, the first optical device determines, for each of a plurality of first optical fibers, a priority band signal as a wavelength band signal among a plurality of first wavelength band signals constituting a first wavelength multiplexing optical signal propagating through each of a plurality of the first optical fibers, based on priority degrees of a plurality of the first wavelength band signals. Then, the first optical device has a configuration that changes a transmission line of each of the priority band signals to the second optical transmission line.

In the example illustrated in FIG. 7, the first optical device 3111 determines a priority band signal S31 as a wavelength band signal in the first optical fiber 111 among a plurality of first wavelength band signals constituting a first wavelength multiplexing optical signal S311 propagating through the first optical fiber 111. In this instance, the first optical device 3111 determines the priority band signal S31, based on priority degrees of a plurality of the first wavelength band signals. Then, the first optical device 3111 changes the transmission line of the priority band signal S31 to the second optical transmission line 120. On the other hand, the second optical device 3120 changes the transmission line of the priority band signal S31 from the second optical transmission line 120 to the first optical fiber 111 included in the first optical transmission line, in a stage after the failure part 101.

The first optical device 3112 determines a priority band signal S32 as a wavelength band signal in the first optical fiber 112 among a plurality of second wavelength band signals constituting a second wavelength multiplexing optical signal S312 propagating through the first optical fiber 112. In this instance, the first optical device 3112 determines the priority band signal S32, based on priority degrees of a plurality of the second wavelength band signals. Then, the first optical device 3112 changes the transmission line of the priority band signal S32 to the second optical transmission line 120. On the other hand, the second optical device 3120 changes the transmission line of the priority band signal S32 from the second optical transmission line 120 to the first optical fiber 112 included in the first optical transmission line, in a stage after the failure part 102.

Thus, for example, when a failure occurs in each of a plurality of operational optical fibers through which an operational optical signal propagates, the optical transmission system 3000 according to the present example embodiment enables a wavelength band signal being high in setting of a priority degree among wavelength band signals each propagating through each of the operational optical fibers to be switched to a reserve (spare) optical fiber and propagate therethrough.

The priority degree is defined by a plurality of priority degree levels, for example, three stages of low, medium, and high, or five stages of 1, 2, 3, 4, and 5, or the like. Then, each of the first optical devices 3111 and 3112 is able to have, for example, a configuration that prioritizes a wavelength band signal being higher in priority degree level, and changes a transmission line thereof. Without being limited thereto, each of the first optical devices 3111 and 3112 may prioritize a wavelength band signal at a moderate priority degree level, and change a transmission line thereof. In this way, among a plurality of wavelength band signals, an order of changing a transmission line is able to be determined based on a priority degree.

In the optical transmission system 3000 according to the present example embodiment, only the priority band signals S31 and S32 each determined based on a priority degree propagates through the second optical transmission line 120. Thus, even in a section (between the first optical device 3111 and the second optical device 3120) being associated with the failure parts 101 and 102, a wavelength band other than a wavelength band occupied by each of the priority band signals S31 and S32 is able to be used as a transmission signal band in the second optical transmission line 120. As a result, failure recovery is able to be accomplished while a wavelength band is more effectively utilized.

Herein, each of the priority band signals S31 and S32 propagating through each of a plurality of first optical fibers 111 and 112 is able to have a configuration occupying each of wavelength bands that do not overlap each other on a frequency axis. Specifically, in the first wavelength multiplexing optical signal S311 and the second wavelength multiplexing optical signal S312, for example, the priority band signals S31 and S32 being high in priority degree are able to be allocated to wavelength bands that do not overlap each other on a frequency axis. This enables, even when a failure occurs in each of a plurality of optical transmission lines, each wavelength band signal being high in priority degree to be transmitted among wavelength band signals each propagating through each optical transmission line.

When a failure occurs in each of a plurality of operational optical fibers through which an operational optical signal propagates, a priority band signal being high in setting of a priority degree among wavelength multiplexing optical signals each propagating through each of the operational optical fibers may be located in a low priority band being low in priority degree among wavelength bands of other operational optical fibers. An operation of an optical transmission system 3001 in such a case is described by use of FIG. 9.

The first optical device 3111 changes, to the another first optical fiber 112, for example, a transmission line of each of priority band signals S31A and S31B being high in priority degree, among a plurality of first wavelength band signals constituting the first wavelength multiplexing optical signal S311 propagating through the first optical fiber 111. In this instance, the first optical device 3111 locates the priority band signals S31A and S31B in a low priority band B12 being low in priority degree among wavelength bands occupied by the second wavelength multiplexing optical signal S312 propagating through the first optical fiber 112. As a result, in addition to priority band signals S32A and S32B included in the second wavelength multiplexing optical signal S312 propagating through the first optical fiber 112, the priority band signals S31A and S31B propagate through the first optical fiber 112, in a stage before the first optical device 3112.

Further, the first optical device 3112 changes a transmission line of each of the priority band signals S31A, S31B, S32A, and S32B to the second optical transmission line, in a stage before the failure part 102. Herein, a case is described where the second optical transmission line includes a plurality of second optical fibers 121 and 122 as illustrated in FIG. 9.

The first optical device 3112 determines a low priority band among second wavelength bands each occupied by each of a plurality of second wavelength band signals constituting the second wavelength multiplexing optical signal propagating through each of a plurality of second optical fibers 121 and 122. In this instance, the first optical device 3112 determines a low priority band for each of a plurality of the second optical fibers, based on a priority degree of each of a plurality of the second wavelength band signals. FIG. 9 illustrates, as an example, a case where the first optical device 3112 determines a low priority band B21 regarding the second optical fiber 121, and determines each low priority band B22 regarding the second optical fiber 122.

Then, the first optical device 3112 locates the priority band signal as a wavelength band signal in a low priority band. In the example illustrated in FIG. 9, the first optical device 3112 locates the priority band signals S31A and S32B in the low priority band B21 of the second optical fiber 121, and locates the priority band signals S31B and S32A in the low priority band B22 of the second optical fiber 122. Thus, the priority band signals S31A, S31B, S32A, and S32B are able to be optimized to and located in the low priority bands B21 and B22 in the second optical fibers 121 and 122 being change destinations of a transmission line. Note that, it is assumed that a low priority band includes an unused band that is not occupied by a wavelength band signal.

On the other hand, the second optical device 3120 changes a transmission line of a priority band signal as a wavelength band signal from the second optical transmission line to the first optical transmission line, in a stage after each of the failure parts 101 and 102. In the example illustrated in FIG. 9, the second optical device 3120 changes a transmission line of each of the priority band signals S31A and S31B from each of the second optical fibers 121 and 122 to the original first optical fiber 111. The second optical device 3120 changes a transmission line of each of the priority band signals S32A and S32B from each of the second optical fibers 121 and 122 to the original first optical fiber 112.

As described above, in each of the optical transmission systems 3000 and 3001 according to the present example embodiment, each of the first optical devices 3111 and 3112 switches a transmission line of a priority band signal in a stage before each of the failure parts 101 and 102. Thereafter, the second optical device 3120 has a configuration that again switches in such a way as to return to the original transmission line in a stage after each of the failure parts 101 and 102. Thus, the priority band signal is not located on another transmission line side in a terminal station device, by detouring each of the failure parts 101 and 102. As a result, even when users of the first optical fibers 111 and 112 and the second optical fibers 121 and 122 differ, security of the users is able to be assured.

Thus, each of the optical transmission systems 3000 and 3001 is able to accomplish failure recovery without impairing stable utilization of the optical transmission system.

Next, an optical device according to the present example embodiment is described. A configuration of the optical device according to the present example embodiment is similar to a configuration of the optical device 1100 according to the first example embodiment illustrated in FIG. 3.

Specifically, the optical device according to the present example embodiment includes a switching unit 1101 for performing either first switching processing or second switching processing, an input connection unit 1102, and an output connection unit 1103. The input connection unit 1102 connects each of the first optical transmission line 110, and the second optical transmission line 120 being the same path as the first optical transmission line 110, to an input side of the switching unit 1101. The output connection unit 1103 connects each of the first optical transmission line 110 and the second optical transmission line 120 to an output side of the switching unit 1101.

Herein, the first switching processing is processing of changing a transmission line of a wavelength band signal propagating through the first optical transmission line 110 to the second optical transmission line 120, in a stage before a failure part in the first optical transmission line 110. The second switching processing is processing of changing the transmission line of the wavelength band signal from the second optical transmission line 120 to the first optical transmission line, in a stage after the failure part.

The optical device according to the present example embodiment has a configuration further including a control unit (control means). The control unit determines a priority band signal as a wavelength band signal for each of a plurality of first optical fibers among a plurality of first wavelength band signals constituting a first wavelength multiplexing optical signal propagating through each of a plurality of the first optical fibers included in the first optical transmission line 110. In this instance, the control unit determines a priority band signal, based on a priority degree of each of a plurality of the first wavelength band signals.

In this case, in the first switching processing, the switching unit 1101 changes a transmission line of each of priority band signals to the second optical transmission line 120.

Herein, each of the priority band signals propagating through each of a plurality of the first optical fibers is able to have a configuration occupying each of wavelength bands that do not overlap each other on a frequency axis.

The control unit (control means) may determine a low priority band from among second wavelength bands each occupied by each of a plurality of second wavelength band signals. A plurality of the second wavelength band signals constitute a second wavelength multiplexing optical signal propagating through a plurality of second optical fibers included in the second optical transmission line 120. In this instance, the control unit determines a low priority band for each of a plurality of the second optical fibers, based on priority degrees of a plurality of the second wavelength band signals. In this case, in the first switching processing, the switching unit 1101 locates a wavelength band signal in a low priority band. Note that, it is assumed that a low priority band includes an unused band that is not occupied by the second wavelength band signal.

Next, an optical transmission method according to the present example embodiment is described.

In the optical transmission method according to the present example embodiment, first, a transmission line of a wavelength band signal propagating through a first optical transmission line is changed to a second optical transmission line being the same path as the first optical transmission line, in a stage before a failure part in the first optical transmission line. Then, the transmission line of the wavelength band signal is changed from the second optical transmission line to the first optical transmission line, in a stage after the failure part.

In the optical transmission method according to the present example embodiment, the processing of changing a transmission line to the second optical transmission line includes the following processing. Specifically, a configuration is provided in which a priority band signal as a wavelength band signal is determined for each of a plurality of first optical fibers among a plurality of first wavelength band signals, based on a priority degree of each of a plurality of the first wavelength band signals, and a transmission line of each of the priority band signals is changed to the second optical transmission line. Herein, a plurality of the first wavelength band signals constitute a first wavelength multiplexing optical signal propagating through each of a plurality of the first optical fibers included in a first optical transmission line.

In this case, each of the priority band signals propagating through each of a plurality of the first optical fibers is able to have a configuration occupying each of wavelength bands that do not overlap each other on a frequency axis.

The above-described processing of changing a transmission line to the second optical transmission line may include the following processing. Specifically, a low priority band may be determined for each of a plurality of second optical fibers among second wavelength bands each occupied by each of a plurality of second wavelength band signals, based on priority degrees of a plurality of the second wavelength band signals, and a wavelength band signal may be located in a low priority band. Herein, a plurality of the second wavelength band signals constitute a second wavelength multiplexing optical signal propagating through each of a plurality of the second optical fibers included in the second optical transmission line. Note that, it is assumed that a low priority band includes an unused band that is not occupied by the second wavelength band signal.

As described above, each of the optical transmission systems 3000 and 3001, the optical device, and the optical transmission method according to the present example embodiment are able to accomplish failure recovery while effectively utilizing a wavelength band without impairing stable utilization of the optical transmission system, even when a failure occurs in a part of an optical fiber within an optical cable.

The optical transmission system, the optical device, and the optical transmission method described above in each of the above-described example embodiments are able to be used in an optical submarine cable transmission system. Herein, the optical device is able to be an optical add drop multiplexer (OADM) including functions of adding and dropping an optical signal on a particular wavelength.

Figure 10A:
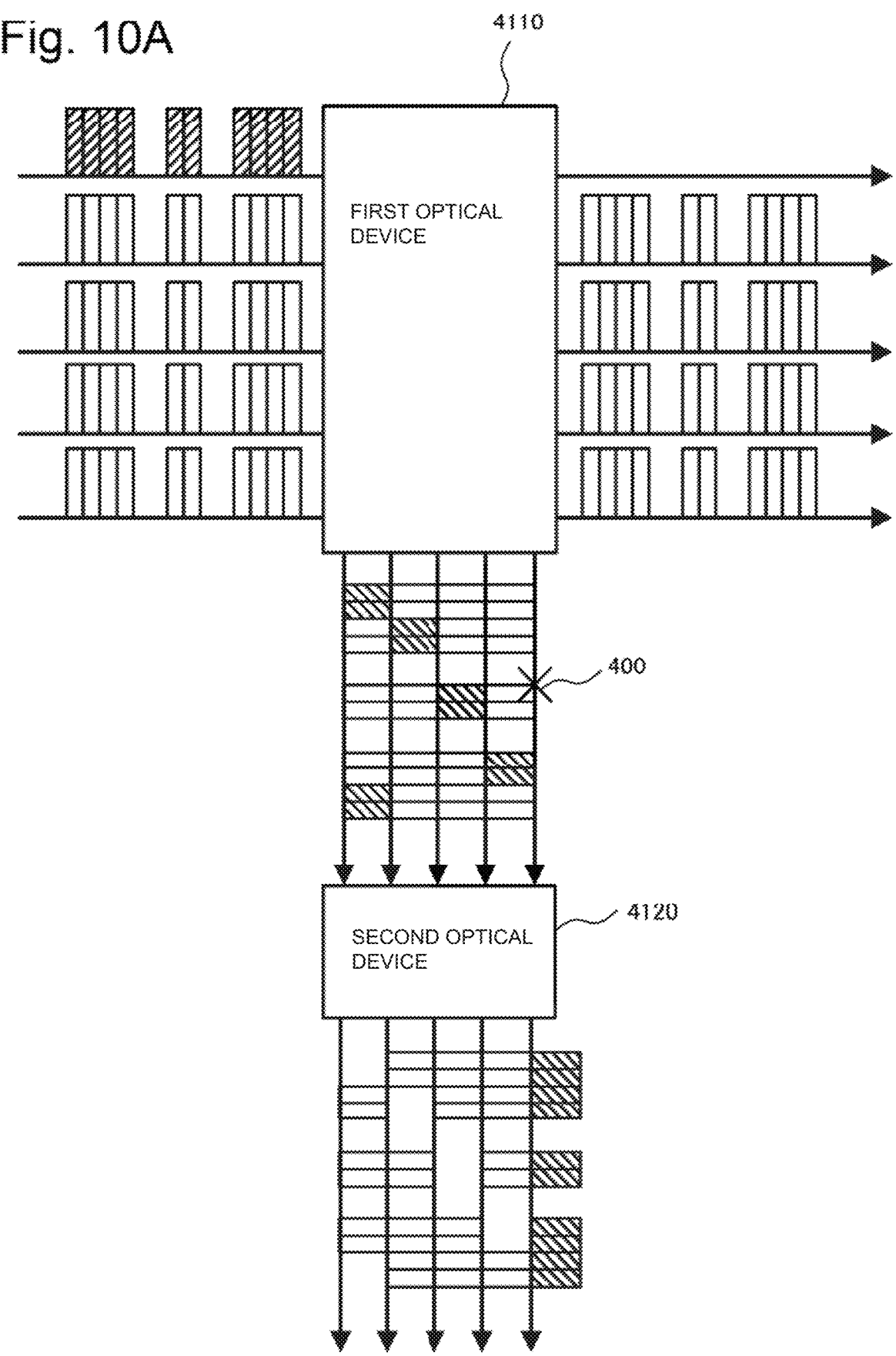
FIG. 10A is a diagram for describing an operation of each of a first optical device and a second optical device according to an example embodiment of the present invention.
Figure 10B:
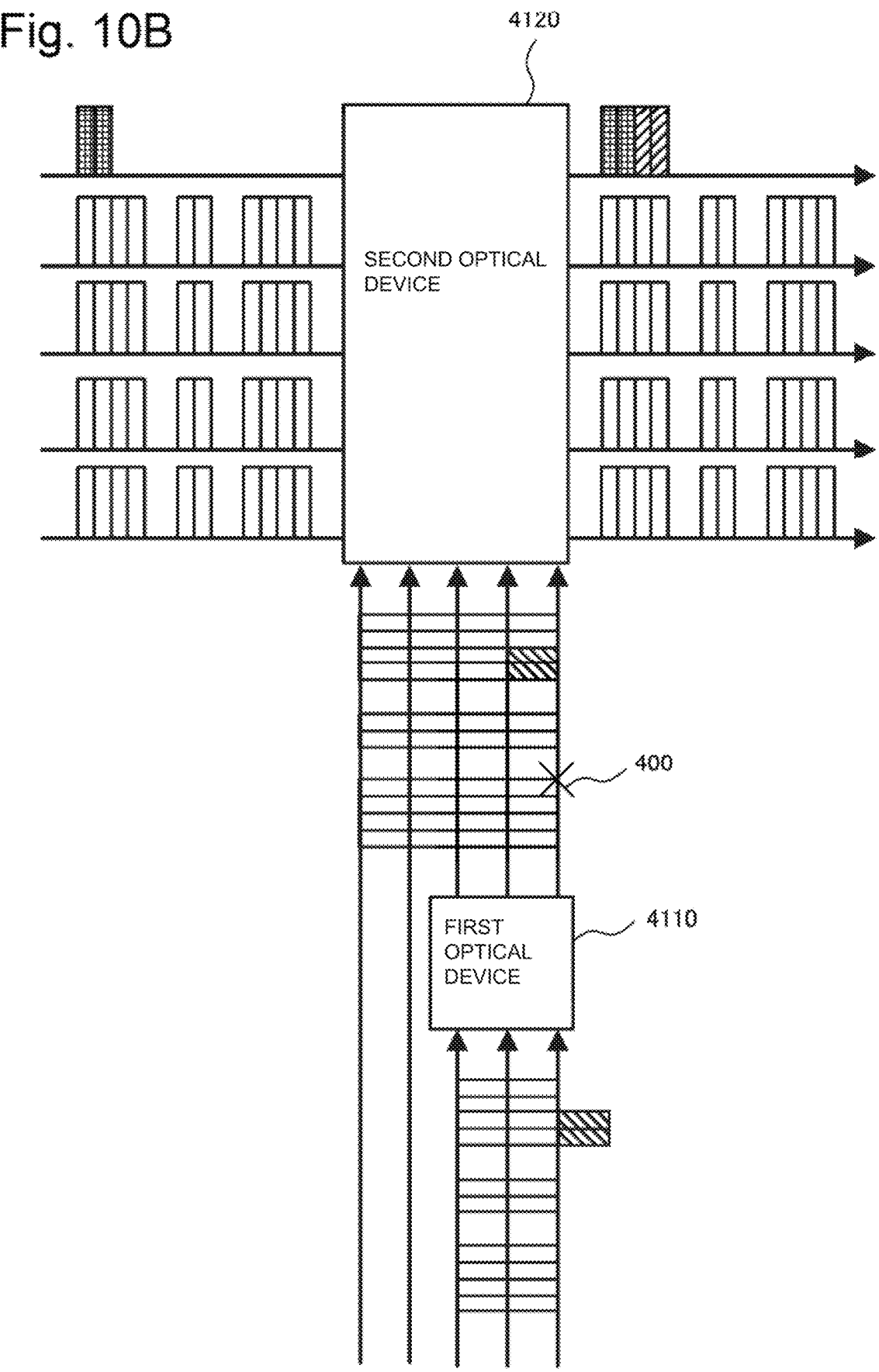
FIG. 10B is a diagram for describing another operation of each of the first optical device and the second optical device according to the example embodiment of the present invention.

The first optical device and the second optical device described in the above-described example embodiment are able to be configurations located in a trunk section linking opposite landing stations (trunk stations) in an optical submarine cable transmission system. Without being limited thereto, a configuration may be provided in which an optical device is located in a branch section linking to a branch station, as illustrated in FIGS. 10A and 10B. FIG. 10A illustrates an example of an operation in which a first optical device 4110 and a second optical device 4120 each drop an optical signal onto a branch station side, when a failure part 400 is present in a branch section. FIG. 10B illustrates an example of an operation in which the first optical device 4110 and the second optical device 4120 each add an optical signal from a branch station side, when the failure part 400 is present in a branch section.

A configuration is able to be provided in which a system monitoring device as an optical network management device included in a terminal station device of a landing station controls an operation of the first optical device and the second optical device in the above-described example embodiment.

The whole or part of the example embodiments disclosed above can be described as, but not limited to, the following supplementary notes.

(Supplementary Note 1) An optical transmission system including: a first optical device configured to change a transmission line of a wavelength band signal propagating through a first optical transmission line to a second optical transmission line being the same path as the first optical transmission line, in a stage before a failure part in the first optical transmission line; and a second optical device configured to change the transmission line of the wavelength band signal from the second optical transmission line to the first optical transmission line, in a stage after the failure part.

(Supplementary Note 2) The optical transmission system according to supplementary note 1, wherein the first optical transmission line includes a plurality of first optical fibers, and the first optical device determines a priority optical fiber among the plurality of first optical fibers, based on priority degrees of the plurality of first optical fibers, and changes the transmission line of the wavelength band signal propagating through the priority optical fiber to the second optical transmission line.

(Supplementary Note 3) The optical transmission system according to supplementary note 1, wherein the first optical device determines a priority band signal as the wavelength band signal among a plurality of first wavelength band signals constituting a first wavelength multiplexing optical signal propagating through the first optical transmission line, based on priority degrees of the plurality of first wavelength band signals, and changes the transmission line of the priority band signal to the second optical transmission line.

(Supplementary Note 4) The optical transmission system according to supplementary note 1, wherein the first optical transmission line includes a plurality of first optical fibers, and the first optical device determines a priority band signal as the wavelength band signal for each of the plurality of first optical fibers among a plurality of first wavelength band signals constituting a first wavelength multiplexing optical signal propagating through each of the plurality of first optical fibers, based on priority degrees of the plurality of first wavelength band signals, and changes each transmission line of the priority band signals to the second optical transmission line.

(Supplementary Note 5) The optical transmission system according to supplementary note 4, wherein each of the priority band signals propagating through each of the plurality of first optical fibers occupies each of wavelength bands that do not overlap one another on a frequency axis.

(Supplementary Note 6) The optical transmission system according to any one of supplementary notes 1 to 5, wherein the second optical transmission line includes a plurality of second optical fibers, and the first optical device determines a low priority optical fiber among the plurality of second optical fibers, based on priority degrees of the plurality of second optical fibers, and changes the transmission line of the wavelength band signal to the low priority optical fiber.

(Supplementary Note 7) The optical transmission system according to any one of supplementary notes 1 to 6, wherein the first optical device determines a low priority band among second wavelength bands each occupied by each of a plurality of second wavelength band signals constituting a second wavelength multiplexing optical signal propagating through the second optical transmission line, based on priority degrees of the plurality of second wavelength band signals, and locates the wavelength band signal in the low priority band.

(Supplementary Note 8) The optical transmission system according to any one of supplementary notes 1 to 5, wherein the second optical transmission line includes a plurality of second optical fibers, and the first optical device determines a low priority band for each of the plurality of second optical fibers among second wavelength bands each occupied by each of a plurality of second wavelength band signals constituting a second wavelength multiplexing optical signal propagating through each of the plurality of second optical fibers, based on priority degrees of the plurality of second wavelength band signals, and locates the wavelength band signal in the low priority band.

(Supplementary Note 9) The optical transmission system according to supplementary note 7 or 8, wherein the low priority band includes an unused band that is not occupied by the second wavelength band signal.

(Supplementary Note 10) An optical device including: a switching means for performing either first switching processing or second switching processing; an input connection means for connecting each of a first optical transmission line and a second optical transmission line being the same path as the first optical transmission line to an input side of the switching means; and an output connection means for connecting each of the first optical transmission line and the second optical transmission line to an output side of the switching means, wherein the first switching processing is processing of changing a transmission line of a wavelength band signal propagating through the first optical transmission line, to the second optical transmission line, in a stage before a failure part in the first optical transmission line, and the second switching processing is processing of changing the transmission line of the wavelength band signal from the second optical transmission line to the first optical transmission line, in a stage after the failure part.

(Supplementary Note 11) The optical device according to supplementary note 10, further including a control means for determining a priority optical fiber among a plurality of first optical fibers included in the first optical transmission line, based on priority degrees of the plurality of first optical fibers, wherein the switching means changes the transmission line of the wavelength band signal propagating through the priority optical fiber, to the second optical transmission line, in the first switching processing.

(Supplementary Note 12) The optical device according to supplementary note 10, further including a control means for determining a priority band signal as the wavelength band signal among a plurality of first wavelength band signals constituting a first wavelength multiplexing optical signal propagating through the first optical transmission line, based on priority degrees of the plurality of first wavelength band signals, wherein the switching means changes a transmission line of the priority band signal to the second optical transmission line, in the first switching processing.

(Supplementary Note 13) The optical device according to supplementary note 10, further including a control means for determining a priority band signal as the wavelength band signal for each of a plurality of first optical fibers among a plurality of first wavelength band signals constituting a first wavelength multiplexing optical signal propagating through each of the plurality of first optical fibers included in the first optical transmission line, based on priority degrees of the plurality of first wavelength band signals, wherein the switching means changes a transmission line of each of the priority band signals to the second optical transmission line, in the first switching processing.

(Supplementary Note 14) The optical device according to supplementary note 13, wherein each of the priority band signals propagating through each of the plurality of first optical fibers occupies each of wavelength bands that do not overlap one another on a frequency axis.

(Supplementary Note 15) The optical device according to any one of supplementary notes 10 to 14, further including a control means for determining a low priority optical fiber among a plurality of second optical fibers included in the second optical transmission line, based on priority degrees of the plurality of second optical fibers, wherein the switching means changes the transmission line of the wavelength band signal to the low priority optical fiber, in the first switching processing.

(Supplementary Note 16) The optical device according to any one of supplementary notes 10 to 15, further including a control means for determining a low priority band among second wavelength bands each occupied by each of a plurality of second wavelength band signals constituting a second wavelength multiplexing optical signal propagating through the second optical transmission line, based on priority degrees of the plurality of second wavelength band signals, wherein the switching means locates the wavelength band signal in the low priority band, in the first switching processing.

(Supplementary Note 17) The optical device according to any one of supplementary notes 10 to 14, further including a control means for determining a low priority band for each of a plurality of second optical fibers among second wavelength bands each occupied by each of a plurality of second wavelength band signals constituting a second wavelength multiplexing optical signal propagating through each of the plurality of second optical fibers included in the second optical transmission line, based on priority degrees of the plurality of second wavelength band signals, wherein the switching means locates the wavelength band signal in the low priority band, in the first switching processing.

(Supplementary Note 18) The optical device according to supplementary note 16 or 17, wherein the low priority band includes an unused band that is not occupied by the second wavelength band signal.

(Supplementary Note 19) An optical network management device including: a monitoring means for monitoring occurrence of a failure in a first optical transmission line, and, generating, when occurrence of the failure is detected, failure occurrence information; and a control means for, based on the failure occurrence information, instructing a first optical device being located in a stage before a part where the failure has occurred, to change a transmission line of a wavelength band signal propagating through the first optical transmission line to a second optical transmission line being the same path as the first optical transmission line, and instructing a second optical device being located in a stage after the part where the failure has occurred, to change the transmission line of the wavelength band signal from the second optical transmission line to the first optical transmission line.

(Supplementary Note 20) An optical transmission method including: changing a transmission line of a wavelength band signal propagating through a first optical transmission line to a second optical transmission line being the same path as the first optical transmission line, in a stage before a failure part in the first optical transmission line; and changing the transmission line of the wavelength band signal from the second optical transmission line to the first optical transmission line, in a stage after the failure part.

(Supplementary Note 21) The optical transmission method according to supplementary note 20, wherein the changing the transmission line to the second optical transmission line includes determining a priority optical fiber among a plurality of first optical fibers included in the first optical transmission line, based on priority degrees of the plurality of first optical fibers, and changing the transmission line of the wavelength band signal propagating through the priority optical fiber, to the second optical transmission line.

(Supplementary Note 22) The optical transmission method according to supplementary note 20, wherein the changing the transmission line to the second optical transmission line includes determining a priority band signal as the wavelength band signal among a plurality of first wavelength band signals constituting a first wavelength multiplexing optical signal propagating through the first optical transmission line, based on priority degrees of the plurality of first wavelength band signals, and changing a transmission line of the priority band signal to the second optical transmission line.

(Supplementary Note 23) The optical transmission method according to supplementary note 20, wherein the changing the transmission line to the second optical transmission line includes determining a priority band signal as the wavelength band signal for each of a plurality of first optical fibers among a plurality of first wavelength band signals constituting a first wavelength multiplexing optical signal propagating through each of the plurality of first optical fibers included in the first optical transmission line, based on priority degrees of the plurality of first wavelength band signals, and changing a transmission line of each of the priority band signals to the second optical transmission line.

(Supplementary Note 24) The optical transmission method according to supplementary note 23, wherein each of the priority band signals propagating through each of the plurality of first optical fibers occupies each of wavelength bands that do not overlap one another on a frequency axis.

(Supplementary Note 25) The optical transmission method according to any one of supplementary notes 20 to 24, wherein the changing the transmission line to the second optical transmission line includes determining a low priority optical fiber among a plurality of second optical fibers included in the second optical transmission line, based on priority degrees of the plurality of second optical fibers, and changing the transmission line of the wavelength band signal to the low priority optical fiber.

(Supplementary Note 26) The optical transmission method according to any one of supplementary notes 20 to 25, wherein the changing the transmission line to the second optical transmission line includes determining a low priority band among second wavelength bands each occupied by each of a plurality of second wavelength band signals constituting a second wavelength multiplexing optical signal propagating through the second optical transmission line, based on priority degrees of the plurality of second wavelength band signals, and locating the wavelength band signal in the low priority band.

(Supplementary Note 27) The optical transmission method according to any one of supplementary notes 20 to 24, wherein the changing the transmission line to the second optical transmission line includes determining a low priority band for each of a plurality of second optical fibers among second wavelength bands each occupied by each of a plurality of second wavelength band signals constituting a second wavelength multiplexing optical signal propagating through each of the plurality of second optical fibers included in the second optical transmission line, based on priority degrees of the plurality of second wavelength band signals, and locating the wavelength band signal in the low priority band.

(Supplementary Note 28) The optical transmission method according to supplementary note 26 or 27, wherein the low priority band includes an unused band that is not occupied by the second wavelength band signal.

(Supplementary Note 29) An optical transmission method including: causing a first wavelength multiplexing optical signal to propagate through a first optical transmission line; causing a second wavelength multiplexing optical signal to propagate through a second optical transmission line being the same path as the first optical transmission line; and when a failure occurs in the first optical transmission line, stopping propagation of the second wavelength multiplexing optical signal in a stage before a part where the failure has occurred, and changing a transmission line of a wavelength band signal constituting the first wavelength multiplexing optical signal to the second optical transmission line, and changing the transmission line of the wavelength band signal from the second optical transmission line to the first optical transmission line, in a stage after the part where the failure has occurred.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-041096, filed on Mar. 10, 2020, the disclosure of which is incorporated herein in its entirety by reference.

REFERENCE SIGNS LIST 1000, 2000, 2001, 3000, 3001 Optical transmission system
1100 Optical device
1101 Switching unit
1102 Input connection unit
1103 Output connection unit
1110, 2110, 3111, 3112, 4110 First optical device
1120, 2120, 3120, 4120 Second optical device
1200 Optical network management device
1210 Monitoring unit
1220 Control unit
100, 101, 102, 400 Failure part
110 First optical transmission line
111, 112 First optical fiber
120 Second optical transmission line
121, 122 Second optical fiber

What is claimed is:

1. An optical transmission system comprising:
a first optical device configured to change a transmission line of a wavelength band signal propagating through a first optical transmission line to a second optical transmission line being a same path as the first optical transmission line, in a stage before a failure part in the first optical transmission line; and
a second optical device configured to change the transmission line of the wavelength band signal from the second optical transmission line to the first optical transmission line, in a stage after the failure part; wherein
the first optical transmission line includes a plurality of first optical fibers, and
the first optical device determines a priority band signal as the wavelength band signal for each of the plurality of first optical fibers among a plurality of first wavelength band signals constituting a first wavelength multiplexing optical signal propagating through each of the plurality of first optical fibers, based on priority degrees of the plurality of first wavelength band signals, and changes each transmission line of the priority band signals to the second optical transmission line.

2. The optical transmission system according to claim 1, wherein
the first optical device determines a priority optical fiber among the plurality of first optical fibers, based on priority degrees of the plurality of first optical fibers, and changes the transmission line of the wavelength band signal propagating through the priority optical fiber to the second optical transmission line.

3. The optical transmission system according to claim 1, wherein
each of the priority band signals propagating through each of the plurality of first optical fibers occupies each of wavelength bands that do not overlap one another on a frequency axis.

4. The optical transmission system according to claim 1, wherein
the second optical transmission line includes a plurality of second optical fibers, and
the first optical device determines a low priority optical fiber among the plurality of second optical fibers, based on priority degrees of the plurality of second optical fibers, and changes the transmission line of the wavelength band signal to the low priority optical fiber.

5. The optical transmission system according to claim 1, wherein
the first optical device determines a low priority band among second wavelength bands each occupied by each of a plurality of second wavelength band signals constituting a second wavelength multiplexing optical signal propagating through the second optical transmission line, based on priority degrees of the plurality of second wavelength band signals, and locates the wavelength band signal in the low priority band.

6. The optical transmission system according to claim 5, wherein
the low priority band includes an unused band that is not occupied by the second wavelength band signal.

7. The optical transmission system according to claim 1, wherein
the second optical transmission line includes a plurality of second optical fibers, and
the first optical device determines a low priority band for each of the plurality of second optical fibers among second wavelength bands each occupied by each of a plurality of second wavelength band signals constituting a second wavelength multiplexing optical signal propagating through each of the plurality of second optical fibers, based on priority degrees of the plurality of second wavelength band signals, and locates the wavelength band signal in the low priority band.

8. An optical transmission method comprising:
changing a transmission line of a wavelength band signal propagating through a first optical transmission line to a second optical transmission line being a same path as the first optical transmission line, in a stage before a failure part in the first optical transmission line; and
changing the transmission line of the wavelength band signal from the second optical transmission line to the first optical transmission line, in a stage after the failure part; wherein
the changing the transmission line to the second optical transmission line includes determining a priority band signal as the wavelength band signal for each of a plurality of first optical fibers among a plurality of first wavelength band signals constituting a first wavelength multiplexing optical signal propagating through each of the plurality of first optical fibers included in the first optical transmission line, based on priority degrees of the plurality of first wavelength band signals, and changing a transmission line of each of the priority band signals to the second optical transmission line.

9. The optical transmission method according to claim 8, wherein
the changing the transmission line to the second optical transmission line includes determining a priority optical fiber among the plurality of first optical fibers, based on priority degrees of the plurality of first optical fibers, and changing the transmission line of the wavelength band signal propagating through the priority optical fiber, to the second optical transmission line.

* * * * *